(12) United States Patent
Kim (10) Patent No.: US 9,841,553 B2
(45) Date of Patent: Dec. 12, 2017

(54) DISPLAY DEVICE HAVING ADHESIVE FRAMING MEMBER FOR OPTICAL SHEETS

(71) Applicant: Samsung Display Co., LTD., Yongin, Gyeonggi-Do (KR)

(72) Inventor: Taechang Kim, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 102 days.

(21) Appl. No.: 14/814,819

(22) Filed: Jul. 31, 2015

(65) Prior Publication Data

US 2016/0178836 A1   Jun. 23, 2016

(30) Foreign Application Priority Data

Dec. 23, 2014 (KR) .................. 10-2014-0187191

(51) Int. Cl.
*G02F 1/13357* (2006.01)
*F21V 8/00* (2006.01)

(52) U.S. Cl.
CPC ............ *G02B 6/0088* (2013.01); *G02B 6/005* (2013.01); *G02B 6/0055* (2013.01); *G02B 6/0083* (2013.01)

(58) Field of Classification Search
CPC . F21V 2200/20; F21V 2103/10; G02B 6/009; G02B 6/0091; G09F 13/18; G09F 2013/1872; G09F 2013/1881
See application file for complete search history.

(56) References Cited

U.S. PATENT DOCUMENTS

| 7,548,287 B2 * | 6/2009 | Oh ....................... | G02B 6/0091 349/150 |
| 7,771,108 B2 * | 8/2010 | Iwasaki ............... | G02B 6/0041 349/65 |
| 8,147,113 B2 * | 4/2012 | Hamada ............... | G02B 6/0085 362/218 |
| 8,154,702 B2 * | 4/2012 | Kim ..................... | G02B 6/0083 349/150 |
| 8,403,548 B2 * | 3/2013 | Kim ..................... | G02B 6/0021 349/64 |
| 8,434,925 B2 * | 5/2013 | Sakamoto ............. | G02B 6/009 362/249.02 |

(Continued)

FOREIGN PATENT DOCUMENTS

| KR | 1020050049738 A | 5/2005 |
| KR | 1020130142624 A | 12/2013 |
| KR | 1020140026187 A | 3/2014 |

*Primary Examiner* — Ismael Negron
(74) *Attorney, Agent, or Firm* — H.C. Park & Associates, PLC (57) ABSTRACT

A display device includes a display panel; a light source supplying light to the display panel; a lower frame on which the light source and the display panel are disposed; a light guide plate disposed between the lower frame and the display panel and dissipating light emitted from the light source toward the display panel; an optical sheet disposed between the light guide plate and the display panel; and an adhesive member having one surface attached to the display panel and the other surface attached to the optical sheet, wherein the adhesive member includes a base portion disposed between the optical sheet and the display panel; and a protrusion portion protruding on a surface of the base portion and disposed on a side surface of the optical sheet.

17 Claims, 9 Drawing Sheets

(56) References Cited

U.S. PATENT DOCUMENTS

| | | | | |
|---|---|---|---|---|
| 8,459,857 B2* | 6/2013 | Shibata | ............... | G02B 6/009 362/607 |
| 8,872,996 B2* | 10/2014 | Kim | ............... | G02B 6/0068 349/58 |
| 8,944,668 B2* | 2/2015 | Kuromizu | ............ | G02B 6/0088 349/58 |
| 9,194,999 B2* | 11/2015 | Horiuchi | ............... | G02B 6/0091 |
| 2014/0146263 A1 | 5/2014 | Mori et al. | | |
| 2014/0218618 A1* | 8/2014 | Sasaoka | ............... | G02B 6/0085 348/725 |
| 2015/0177449 A1* | 6/2015 | Uchida | ............ | G02F 1/133308 362/611 |
| 2015/0247965 A1* | 9/2015 | Song | ............... | G02B 6/0073 362/606 |

* cited by examiner

DISPLAY DEVICE HAVING ADHESIVE FRAMING MEMBER FOR OPTICAL SHEETS

CLAIM OF PRIORITY

This application claims the priority of and all the benefits accruing under 35 U.S.C. §119 of Korean Patent Application No. 10-2014-0187191, filed on Dec. 23, 2014, with the Korean Intellectual Property Office (KIPO), the disclosure of which is incorporated herein in its entirety by reference.

BACKGROUND OF THE INVENTION

1. Field of Disclosure

Embodiments of the present invention relate to a display device, and more particularly, to a display device preventing an optical sheet from being pressed down and including an adhesive member fixing a display panel.

2. Description of the Related Art

A liquid crystal display (LCD) device is a type of flat panel display (FPD) device which has found wide recent acceptance. Such an LCD device includes two substrates having electrodes formed thereon and a liquid crystal layer interposed therebetween. Upon voltages being applied to the electrodes, liquid crystal molecules of the liquid crystal layer are rearranged, whereby the amount of transmitted light is adjusted.

An LCD device, a passive light emitting device, includes a display panel displaying an image and a backlight assembly supplying light to the display panel. A backlight assembly is classified into types including a direct-type backlight assembly, an edge-type backlight assembly, and a corner-type backlight assembly based on a position of a light source.

In order to provide a relatively slim display device, a display panel is attached directly to a lower frame and an optical sheet. Accordingly, the optical sheet is pressed down due to weight of the display panel. In a case in which an additional stopper is attached between the optical sheet and the display panel using a double-sided tape in order to prevent such a phenomenon of the optical sheet being pressed down by the display panel, an issue of an increase in a thickness of the display device may arise.

Meanwhile, such a tape used to attach the display panel to the lower frame and the optical sheet may absorb or disperse light emitted from a light source, thereby causing a light loss.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a display device capable of stably fixing a display panel, preventing an optical sheet being pressed down, and preventing a light loss.

According to an exemplary embodiment of the present invention, a display device includes: a display panel; a light source supplying light to the display panel; a lower frame on which the light source and the display panel are disposed; a light guide plate disposed between the lower frame and the display panel and dissipating light emitted from the light source toward the display panel; an optical sheet disposed between the light guide plate and the display panel; and an adhesive member having one surface attached to the display panel and the other surface attached to the optical sheet, wherein the adhesive member includes a base portion disposed between the optical sheet and the display panel; and a protrusion portion protruding on a surface of the base portion and disposed on a side surface of the optical sheet.

The base portion may be disposed between the lower frame and the display panel.

The lower frame may include a bottom portion; a side surface portion extending from the bottom portion; and a panel support portion extending from the side surface portion to be parallel with respect to the bottom portion.

The base portion may be disposed between the panel support portion and the display panel.

The light source may be disposed between the bottom portion and the panel support portion.

The display device may further include an intermediate frame coupled to the lower frame and on which the display panel is disposed.

The intermediate frame may include: a support portion on which the display panel is disposed; and a side wall portion extending from a surface of the support portion.

The base portion may be disposed between the support portion and the display panel.

The adhesive member may further include an edge portion extending from the base portion and disposed along an edge of the display panel.

The edge portion may be disposed between the intermediate frame and the display panel.

The edge portion may be disposed between the support portion and the display panel.

The protrusion portion may be in contact with the light guide plate.

The protrusion portion may be disposed between the support portion and the optical sheet.

The protrusion portion may have a thickness greater than or equal to a thickness of the optical sheet.

The adhesive member may have a reflective surface reflecting light emitted from the light guide plate.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

All terminologies used herein are merely used to describe embodiments of the inventive concept and may be modified according to the relevant art and the intention of an applicant. Therefore, the terms used herein should be interpreted as having a meaning that is consistent with their meanings in the context of the present disclosure, and is not intended to limit the invention. As used herein, the singular forms "a," "an," and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to a first exemplary embodiment of the present invention will be described with reference to FIGS. 1 through 3B.

Figure 1:
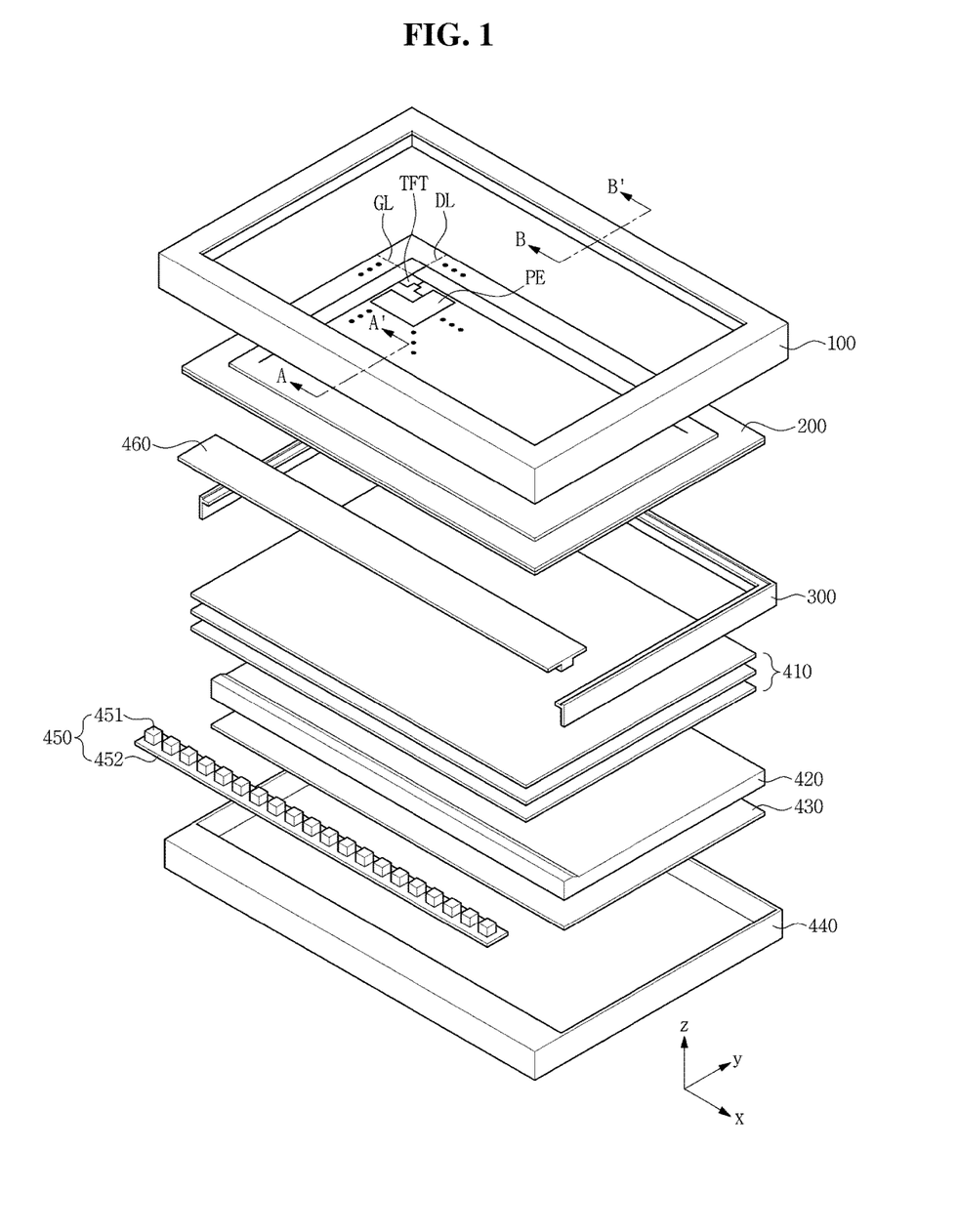
FIG. 1 is an exploded perspective view schematically illustrating a display device according to a first exemplary embodiment of the present invention.
Figure 2A:
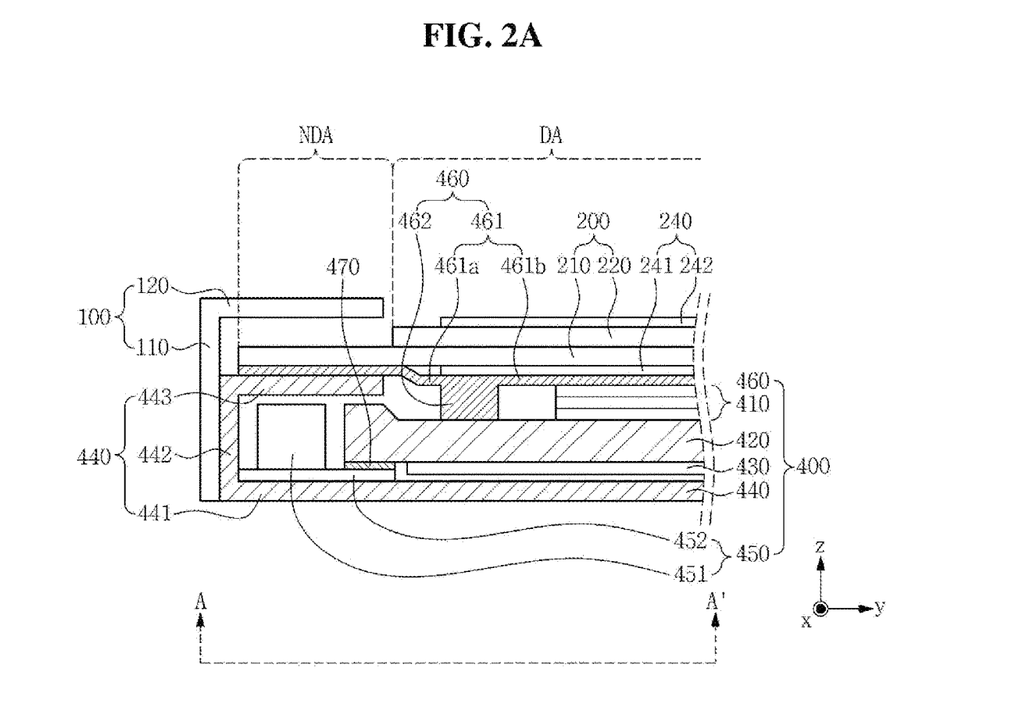
FIG. 2A is a cross-sectional view taken along line A-A' of FIG. 1.

FIG. 1 is an exploded perspective view schematically illustrating a display device according to a first exemplary embodiment of the present invention; FIG. 2A is a cross-sectional view taken along line A-A' of FIG. 1; and FIG. 2B is a cross-sectional view taken along line B-B' of FIG. 1.

Figure 2B:
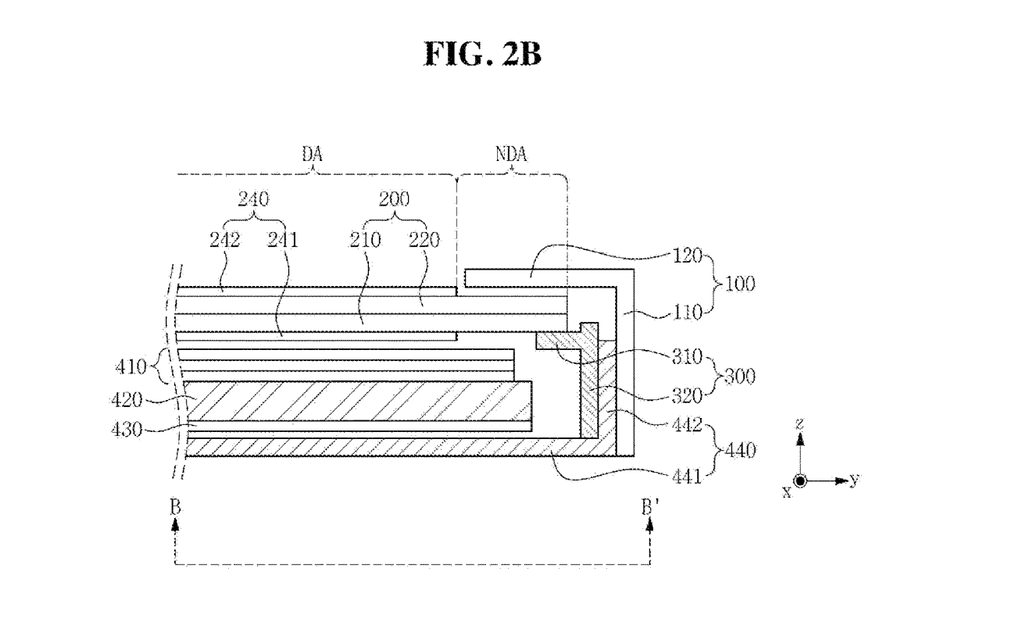
FIG. 2B is a cross-sectional view taken along line B-B' of FIG. 1.

Referring to FIGS. 1 through 2B, the display device according to the first exemplary embodiment may include a display panel 200, a backlight assembly 400 supplying light to the display panel 200, an upper frame 100 provided in a form for enclosing the display panel 200, and an intermediate frame 300 on which the display panel 200 is mounted.

The upper frame 100 may be coupled to a lower frame 440 to thereby cover an edge of the display panel 200 mounted on the intermediate frame 300. The upper frame 100 may include a first portion 110 coupled to the lower frame 440 and a second portion 120 extending from the first portion 110. The edge of the display panel 200 covered by the upper frame 100 may be a non-display area NDA. The upper frame 100 may have an open window at a center portion thereof through which the display panel 200 may be exposed.

The upper frame 100 may be fastened to the lower frame 440 through hook coupling and/or screw coupling. In addition, the coupling of the upper frame 100 and the lower frame 440 may be modified in various manners.

The display panel 200 may be configured to display images. The display panel 200, a light-receiving type display panel, may be categorized into types including a liquid crystal display (LCD) panel, an electrowetting display panel, an electrophoretic display panel, a microelectromechanical system (MEMS) display panel, and the like. By way of example, an LCD panel is described in the first exemplary embodiment.

The display panel 200 may be provided in a quadrangular planar form having two pairs of parallel sides. According to the first exemplary embodiment, the display panel 200 may have a rectangular form having a pair of relatively long sides and a pair of relatively short sides. The display panel 200 may include a first substrate 210, a second substrate 220 opposing the first substrate 210, and a liquid crystal layer (not illustrated) interposed between the first and second substrates 210 and 220. The display panel 200, when viewed in a plane, may have a display area DA that displays an image and a non-display area NDA that surrounds the display area DA and does not display an image. The non-display area NDA may be covered by the upper frame 100.

The first substrate 210 may include a plurality of pixel electrodes PE (FIG. 1) and a plurality of thin film transistors (TFTs, FIG. 1) electrically connected to the pixel electrodes PE in one-to-one correspondence. A data line DL may be connected to a source electrode of the TFT, a gate line GL may be connected to a gate electrode of the TFT and a pixel electrode may be connected to a drain electrode of the TFT. Each TFT may function as a switch of a driving signal supplied to a corresponding pixel electrode. Further, the second substrate 220 may include a common electrode (not illustrated) forming an electric field that controls an arrangement of liquid crystals along with the pixel electrodes. The display panel 200 may be configured to drive the liquid crystal layer to display an image frontwards.

The display panel 200 may include a driving chip (not illustrated) configured to supply a driving signal, a driving-chip mounting film (not illustrated) on which the driving chip is mounted, and a printed circuit board (PCB, not illustrated) electrically connected to the display panel 200 through the driving-chip mounting film. The driving-chip mounting film may be a tape carrier package (TCP).

The driving chip may generate a driving signal for driving the display panel 200 in response to an external signal. The external signal may be supplied from the PCB and may include an image signal, various types of control signals, a driving voltage, and the like.

For instance, a gate PCB may be connected to a gate driving-chip mounting film. The gate PCB may apply an image signal to a gate driving chip. A data PCB may be connected to a data driving-chip mounting film. The data PCB may apply an image signal to a data driving chip.

The gate driving chip may receive the image signal to apply a gate driving signal to the gate line. The data driving chip may receive the image signal to apply a data driving signal to the data line.

A polarizing unit 240 may be disposed on the display panel 200 and may include first and second polarizing plates 241 and 242. The first and second polarizing plates 241 and 242 may be disposed on surfaces of the first and second substrates 210 and 220 which are opposite to surfaces of the first and second substrates 210 and 220 facing one another, respectively. That is, the first polarizing plate 241 may be attached onto an outer side of the first substrate 210 and the second polarizing plate 242 may be attached onto an outer side of the second substrate 220. A transmissive axis of the first polarizing plate 241 may be substantially at right angles with respect to a transmissive axis of the second polarizing plate 242.

The intermediate frame 300 may be coupled to the lower frame 440 and may accommodate the display panel 200 therein. The intermediate frame 300 may include a support portion 310 on which the display panel 200 is disposed and a side wall portion 320 extending from a surface of the support portion 310. The intermediate frame 300 may include a flexible material such as plastics in order to prevent damage to the display panel 200.

The intermediate frame 300 may be provided along the edge of the display panel 200 and may support the display panel 200 downwardly from the display panel 200. The intermediate frame 300 may be provided in a portion of the display panel 200 corresponding to four sides of the display panel 200 or at least one of the four sides of the display panel 200. For example, the intermediate frame 300 may have a quadrilateral-loop form corresponding to the four sides of the display panel 200, or may have a channel shape, that is, a quadrilateral open-loop form corresponding to three of the four sides of the display panel 200.

The backlight assembly 400 may include an optical sheet 410, a light guide plate 420, a reflective sheet 430, the lower frame 440, a light source unit 450, and an adhesive member 460.

The light source unit 450 may include a light source 451 and a circuit board 452 on which the light source 451 is disposed. The light source unit 450 may be disposed in a corner portion or on a light incident surface of the light guide plate 420. In other words, the light source unit 450 may emit light toward the corner portion or the light incident side surface of the light guide plate 420.

The light source 451 may include at least an LED chip (not illustrated) and a package (not illustrated) accommodating the LED chip. The light source 451 may have a light dissipating surface in a direction in which the light guide plate 420 is disposed. Light emitted from the light source 451 may be blue light.

The circuit board 452 may include, for example, a PCB or a metal PCB (MPCB).

Such a light source unit 450 may be provided on one side surface, two, or four side surfaces of the light guide plate 420, based on a size, luminance, uniformity, and the like, of the display panel 200. In some embodiments, the light source unit 450 may be formed on at least a corner portion of the light guide plate 420.

The light guide plate 420 may receive light emitted from the light source 451 and incident on the light incident surface of the light guide plate 420 to thereby emit light toward a light emitting surface of the light guide plate 420. The light guide plate 420 may be configured to uniformly supply light supplied from the light source unit 450 to the display panel 200. The light guide plate 420 may be disposed adjacent to the light source unit 450 and may be accommodated in the lower frame 440. The light guide plate 420 may be attached to the circuit board 452 while having a double-sided tape 470 interposed therebetween. The light guide plate 420 may be provided, for example, in a quadrangular planar form as the display panel 200, but is not limited thereto. In some embodiments, in a case of using an LED as the light source 451, the light guide plate 420 may have various forms including such as a predetermined groove and/or a protrusion based on a position of the light source 451.

Although referred to as a "plate" for ease of description, the light guide plate 420 may have a shape of a sheet or a film in order to achieve slimness of the display device. That is, the light guide plate 420 is to be understood as having a concept that includes not only a plate but also a film for guiding light.

The light guide plate 420 may include a light-transmissive material. The light-transmissive material may include an acrylic resin, such as polymethyl methacrylate (PMMA), or polycarbonate (PC) to guide light efficiently.

A pattern may be formed on at least a surface of the light guide plate 420. For example, a scattering pattern (not illustrated) may be formed to allow light guided to a lower surface of the light guide plate 420 to be emitted upwardly thereof.

The optical sheets 410 may be disposed on the light guide plate 420 and may serve to diffuse and/or collect light transmitted from the light guide plate 420. The optical sheets 410 may include a diffusion sheet, a prism sheet, a protective sheet, and the like.

The diffusion sheet may serve to disperse light incident thereto from the light guide plate 420 to thereby prevent a partial concentration of light.

The prism sheet may include prisms having a triangular cross-section and provided in a predetermined array on a surface of the prism sheet. The prism sheet may be disposed on the diffusion sheet to collect light diffused from the diffusion sheet in a direction perpendicular with respect to the display panel 200.

The protective sheet may be disposed on the prism sheet, may protect a surface of the prism sheet, and may diffuse light in order to achieve uniform light distribution.

The reflective sheet 430 may be disposed between the light guide plate 420 and the lower frame 440, and may reflect light emitted downwardly from the light guide plate 420 to be directed toward the display panel 200, thereby improving light efficiency.

The reflective sheet 430 may include, for example, polyethylene terephthalate (PET), and thus may have reflectivity. A surface of the reflective sheet 430 may be coated with a diffusion layer including, for example, titanium dioxide (TiO2).

In some embodiments, the reflective sheet 430 may be formed of a material containing a metal, such as silver (Ag).

The lower frame 440 may accommodate the reflective sheet 430 and the light guide plate 420. The lower frame 440 may include a bottom portion 441, a side surface portion 442 extending from the bottom portion 441, and a panel support portion 443 extending from the side surface portion 442 to be parallel with respect to the bottom portion 441.

The bottom portion 441 of the lower frame 440 may be parallel with respect to the light guide plate 420. The panel support portion 443 of the lower frame 440 may extend from the side surface portion 442 of the lower frame 440 so as to be substantially parallel with respect to the bottom portion 441 of the lower frame 440. The panel support portion 443 may extend toward a center portion of the bottom portion 441 of the lower frame 440, and the light source 451 may be disposed between the panel support portion 443 and the bottom portion 441. That is, a side of the lower frame 440 may have a channel-shaped cross-section as illustrated in FIG. 2A. The side of the lower frame 440 may have such a channel-shaped cross-section in order to reflect light emitted from the light source 451.

The lower frame 440 may include metal materials having rigidity, such as stainless steel, or materials having excellent heat dissipation properties, such as aluminum (Al) or an Al alloy. The lower frame 440 according to the first exemplary embodiment may maintain a framework of the display device and may protect various components to be accommodated in the display device.

Figure 3A:
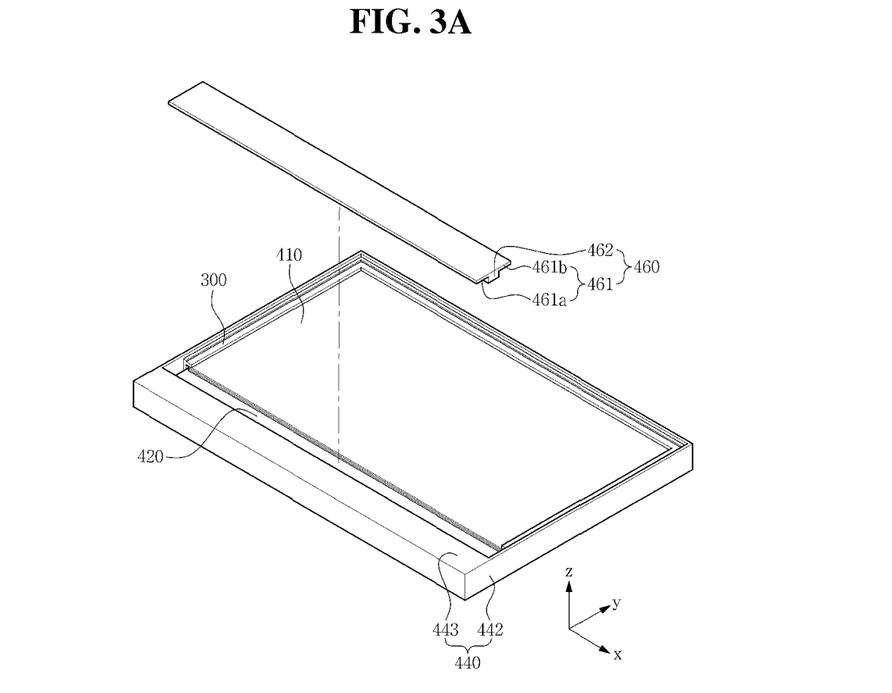
FIG. 3A is an exploded perspective view schematically illustrating an adhesive member and a lower frame of FIG. 1.
Figure 3B:
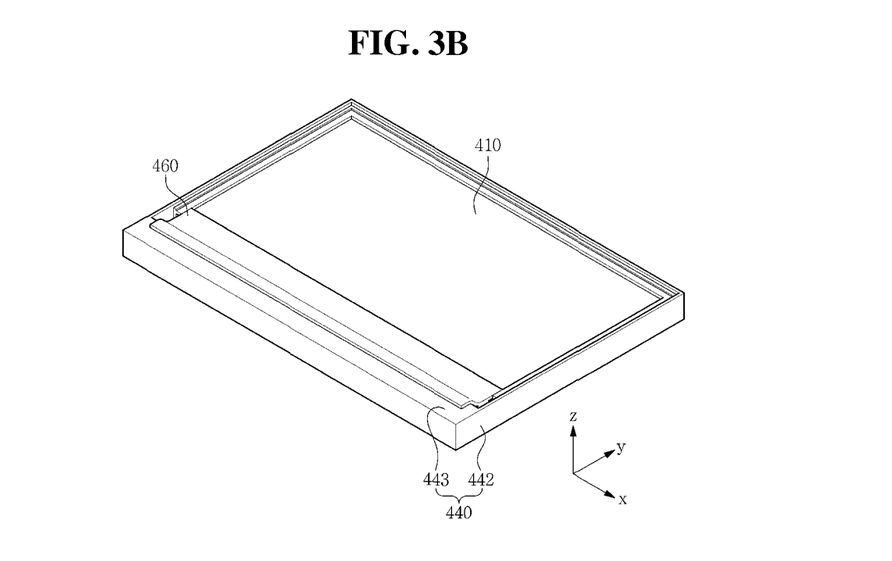
FIG. 3B is a combined perspective view schematically illustrating the adhesive member and the lower frame of FIG. 1.

FIG. 3A is an exploded perspective view schematically illustrating an adhesive member and a lower frame of FIG. 1; and FIG. 3B is a combined perspective view schematically illustrating the adhesive member and the lower frame of FIG. 1.

Referring to FIGS. 3A and 3B, an adhesive member 460 may have one surface attached to the display panel 200 and the other surface attached to the optical sheet 410, thereby bonding the display panel 200 and the optical sheet 410 to one another. The adhesive member 460 according to the first exemplary embodiment may be disposed between the lower frame 440 and the display panel 200. Meanwhile, as illustrated in FIG. 3A, the adhesive member 460 may have a length substantially the same as a length of a side of the display panel 200, and may be disposed in a portion of the display panel 200 corresponding to one of the four sides of the display panel 200. For example, the adhesive member 460 may be disposed in a portion of the display panel 200 corresponding to a side of the display panel 200 most adjacent to the support portion 443. Meanwhile, the adhesive member 460 may have a linear shape.

The adhesive member 460 may include a base portion 461 and a protrusion portion 462. The base portion 461 may be disposed between the optical sheet 410 and the display panel 200. In addition, the base portion 461 may be disposed between the lower frame 440 and the display panel 200, for example, between the panel support portion 443 and the display panel 200. Meanwhile, the base portion 461 may include a first base portion 461a and a second base portion 461b. The first base portion 461a may bond the panel support portion 443 and the display panel 200 to one another, and the second base portion 461b may bond the optical sheet 410 and the display panel 200 to one another. Meanwhile, the base portion 461 may be formed of a base film (not illustrated) formed of a PET resin and an adhesive material (not illustrated).

The protrusion portion 462 may protrude from a surface of the base portion 461, and may be disposed on a side surface of the optical sheet 410. The protrusion portion 462 may be disposed between the display panel 200 and the light guide plate 420 and may be in contact with the light guide plate 420. In detail, the protrusion portion 462 may be disposed between the panel support portion 443 and the optical sheet 410, and may have a thickness greater than or substantially equal to a thickness of the optical sheet 410. The protrusion portion 462 may be a PET tape, and may have a cushioning function. Accordingly, the protrusion portion 462 may prevent the optical sheet 410 being pressed down by dispersing pressure applied to the optical sheet 410 due to weight of the display panel 200.

As such, by integrally forming the base portion 461 having an adhesive function and the protrusion portion 462 having a cushioning function, the display panel 200 may be stably fixed, and the optical sheet 410 may be prevented from being pressed down. Moreover, since an additional component of a cushion tape is unnecessary, a thickness of the display device may be reduced.

Meanwhile, the adhesive member 460 may have a reflective surface reflecting light emitted from the light guide plate 420. The reflective surface of the adhesive member 460 may refer to a surface facing the light source 451. The reflective surface of the adhesive member 460 may be formed of a high-reflectivity resin having significantly high reflectivity and whiteness. Further, the reflective surface of the adhesive member 460 may be coated with a polishing processing layer (not illustrated) in order to increase reflectivity. The polishing processing layer may be formed of Ag or aluminum oxide ($Al_2O_3$). Accordingly, the adhesive member 460 may re-reflect light directed thereto, toward the light guide plate 420 or the optical sheet 410, thereby preventing a light loss.

Hereinafter, a second exemplary embodiment of the present invention will be described with reference to FIGS. 4 through 6B. For conciseness and ease of description, details pertaining to a configuration of a display device according to the second exemplary embodiment including the same content as that discussed hereinbefore with reference to the first exemplary embodiment are omitted.

Figure 4:
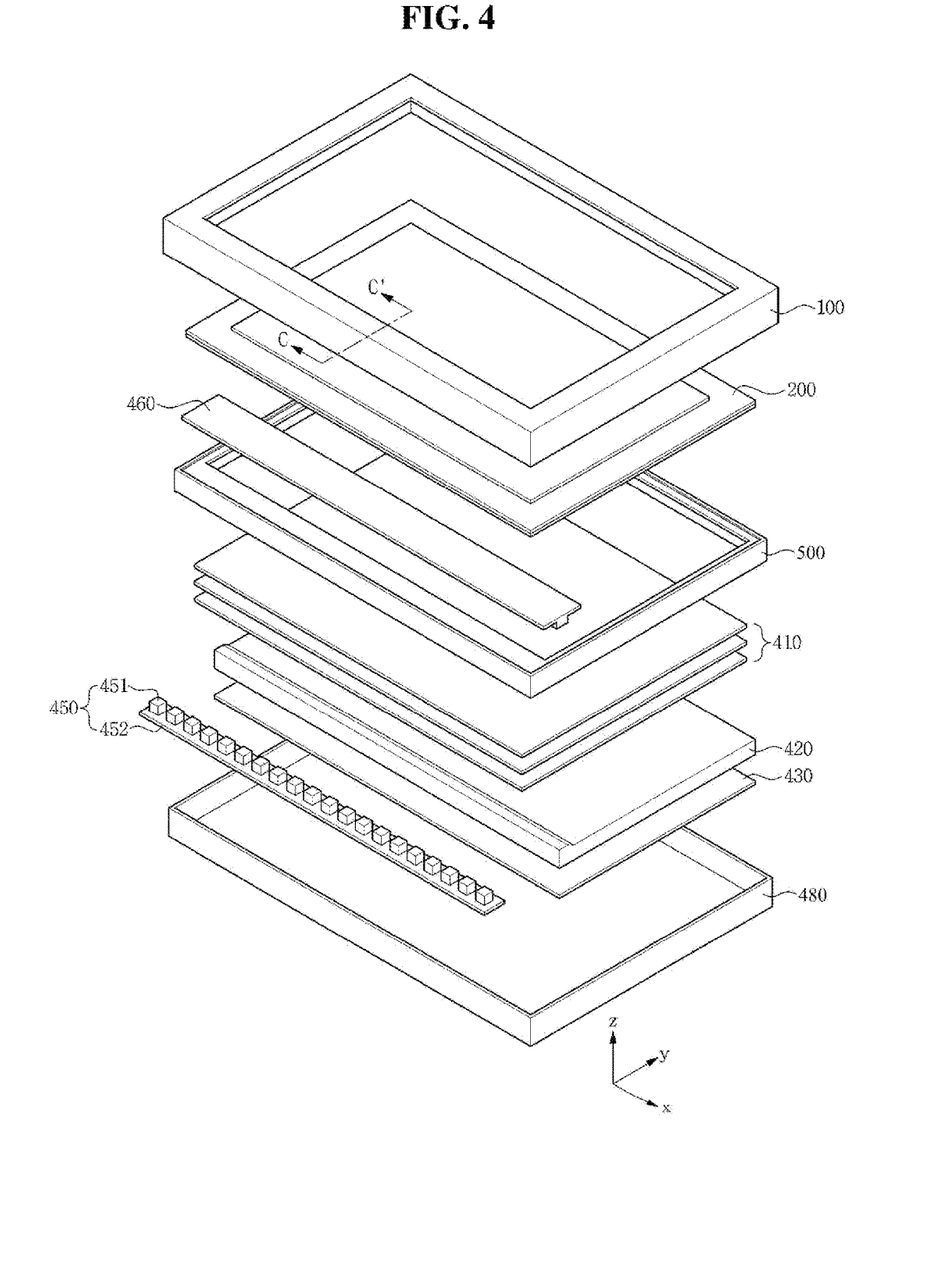
FIG. 4 is an exploded perspective view schematically illustrating a display device according to a second exemplary embodiment of the present invention.
Figure 5:
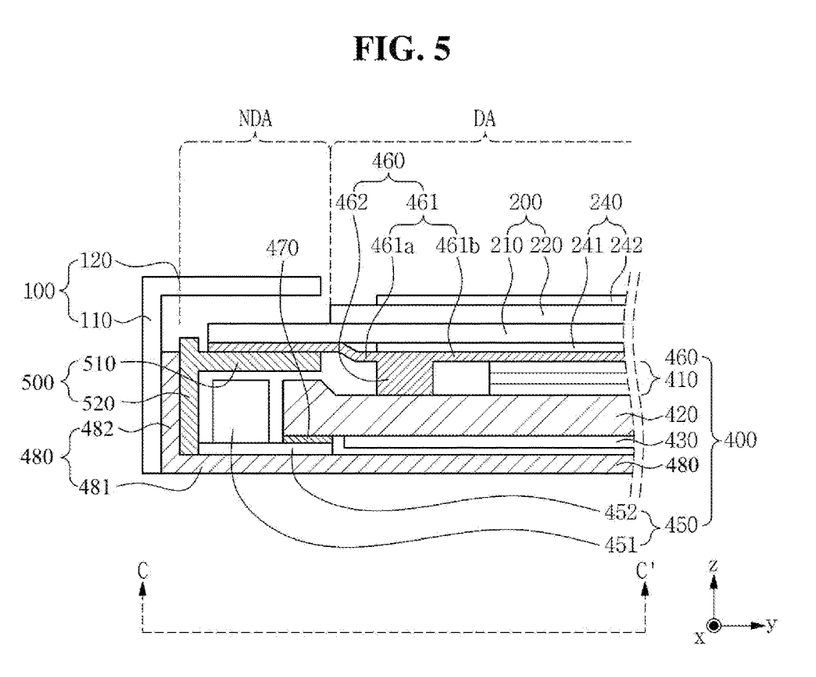
FIG. 5 is a cross-sectional view taken along line C-C' of FIG. 4.
Figure 6A:
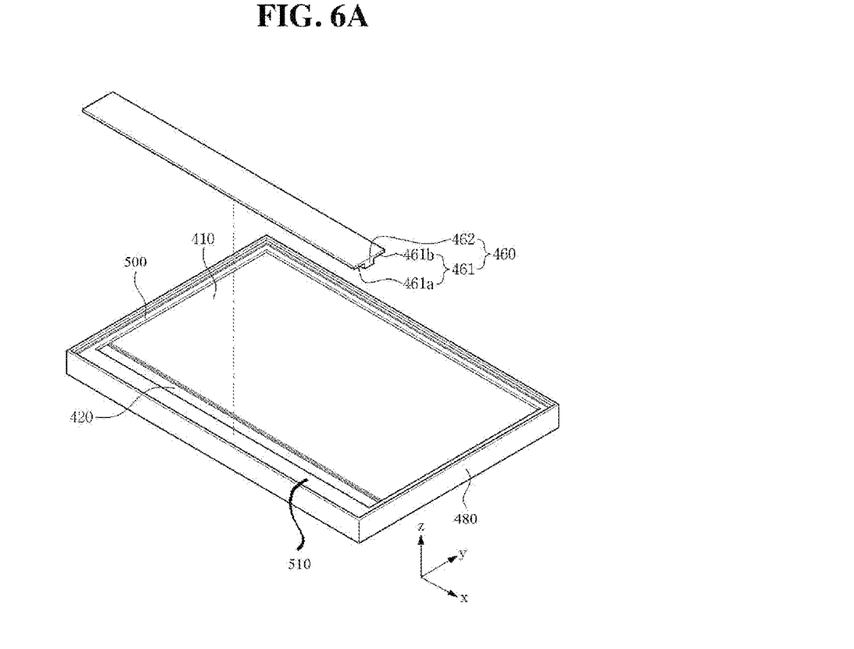
FIG. 6A is an exploded perspective view schematically illustrating an adhesive member and a lower frame of FIG. 4.
Figure 6B:
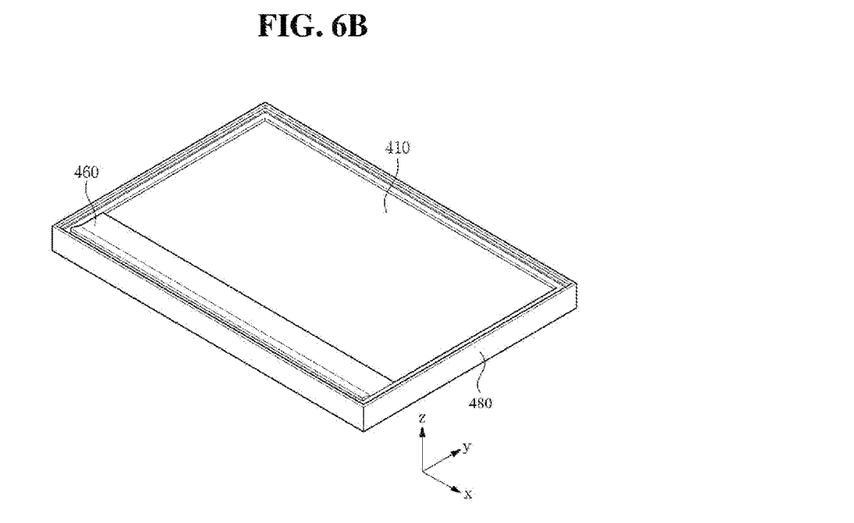
FIG. 6B is a combined perspective view schematically illustrating the adhesive member and the lower frame of FIG. 4.

FIG. 4 is an exploded perspective view schematically illustrating a display device according to a second exemplary embodiment of the present invention; FIG. 5 is a cross-sectional view taken along line C-C' of FIG. 4; the cross-sectional view along a line cutting the side opposite to the side having C-C' line is the same as that in FIG. 2B of the first embodiment shown in FIG. 1; FIG. 6A is an exploded perspective view schematically illustrating an adhesive member and a lower frame of FIG. 4; and FIG. 6B is a combined perspective view schematically illustrating the adhesive member and the lower frame of FIG. 4.

Referring to FIGS. 4 through 6B, an intermediate frame 300 according to the second exemplary embodiment may be provided in a portion of a display panel 200 corresponding to four sides of the display panel 200, and an adhesive member 460 may be disposed between the intermediate frame 300 and the display panel 200. For example, a base portion 461 of the adhesive member 460 may be disposed between a support portion 310 of the intermediate frame 300 and the display panel 200.

Meanwhile, a light source 451 may be disposed between the support portion 510 of the intermediate frame 500 and a bottom portion 480 of a lower frame 483. The display device according to the second exemplary embodiment may have the same effect as in that of the first exemplary embodiment, aside from an omission of the panel support portion 483 of the lower frame 480 and a modified shape of the intermediate frame 500.

Hereinafter, a third exemplary embodiment of the present invention will be described with reference to FIGS. 7 through 9B. For conciseness and ease of description, details pertaining to a configuration of a display device according to the third exemplary embodiment including the same content as that discussed hereinbefore with reference to the first exemplary embodiment are omitted.

Figure 7:
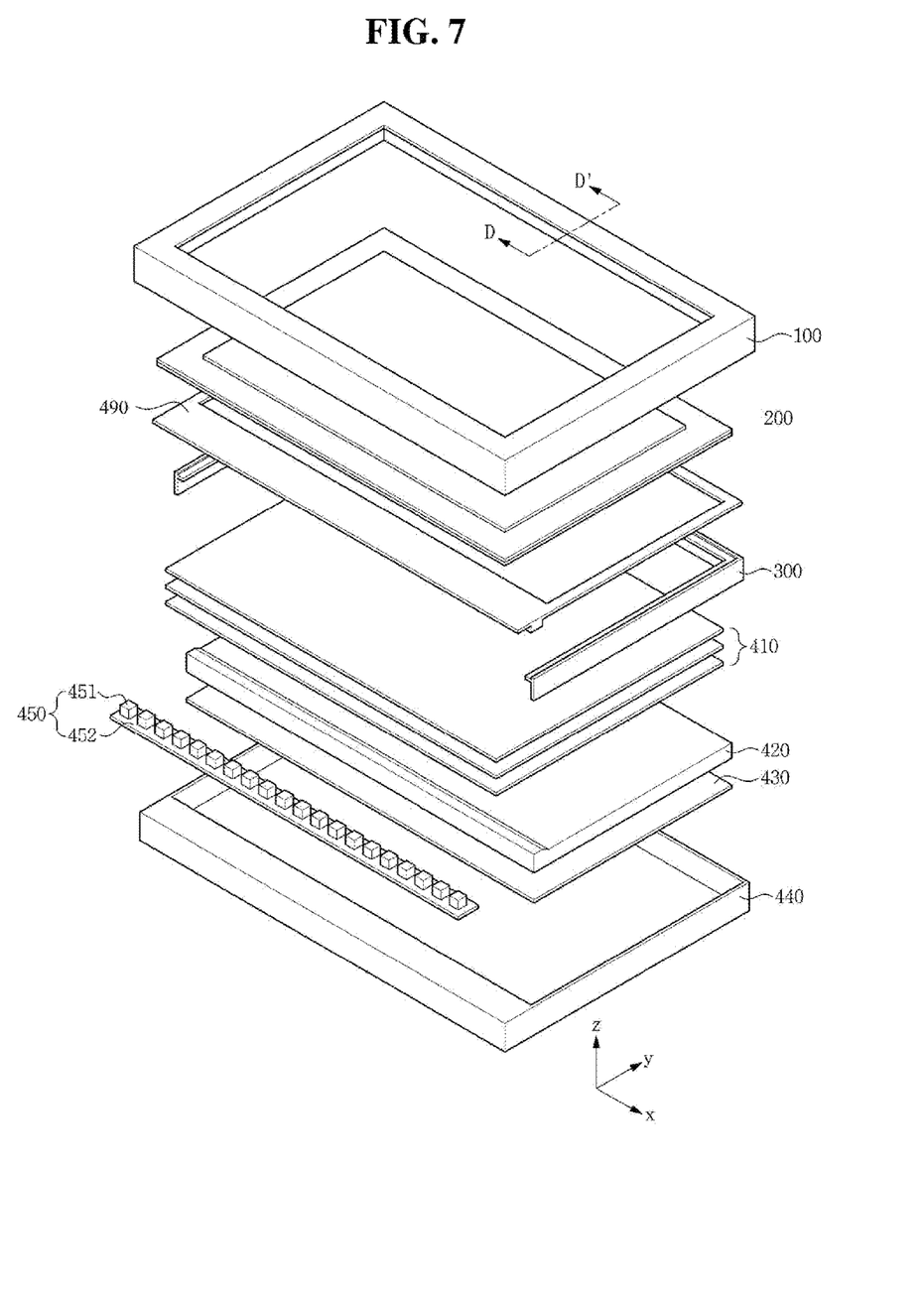
FIG. 7 is an exploded perspective view schematically illustrating a display device according to a third exemplary embodiment of the present invention.
Figure 8:
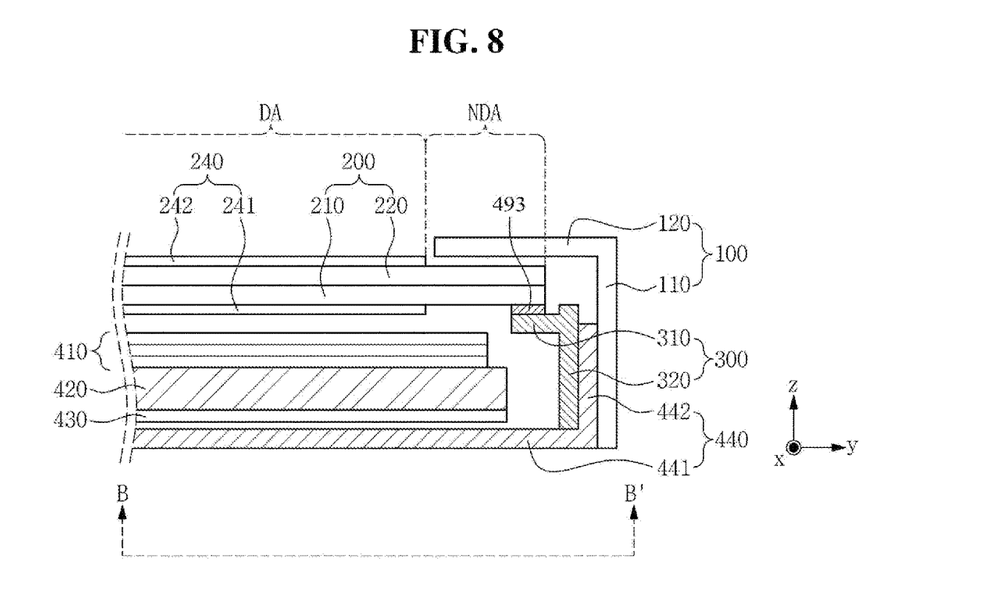
FIG. 8 is a cross-sectional view taken along line D-D' of FIG. 7.
Figure 9A:
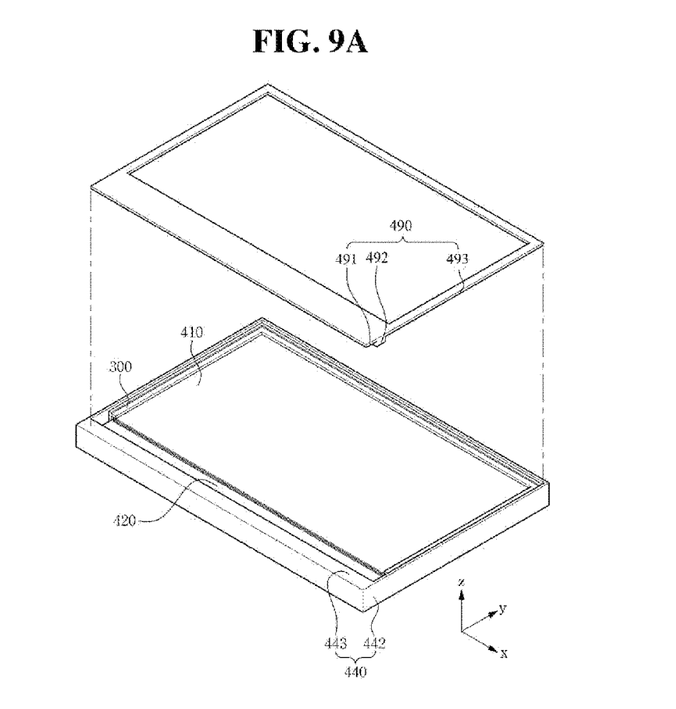
FIG. 9A is an exploded perspective view schematically illustrating an adhesive member and a lower frame of FIG. 7.
Figure 9B:
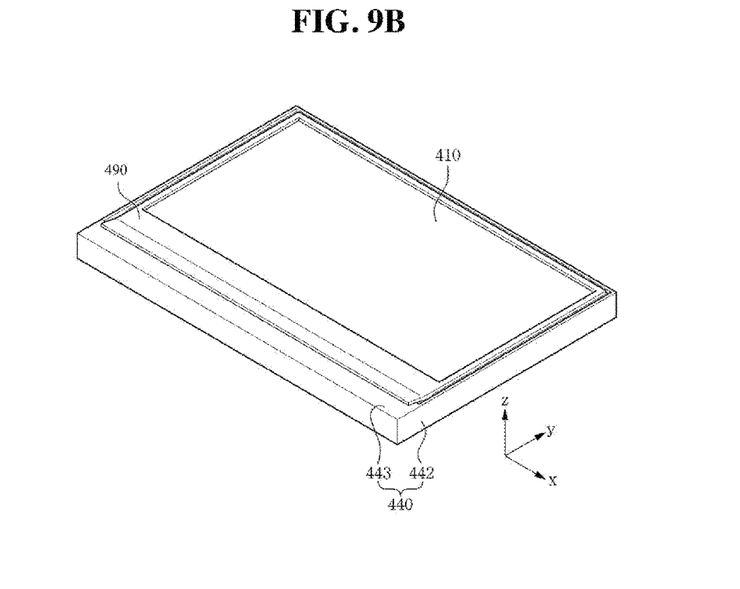
FIG. 9B is a combined perspective view schematically illustrating the adhesive member and the lower frame of FIG. 7.

FIG. 7 is an exploded perspective view schematically illustrating a display device according to a third exemplary embodiment of the present invention; FIG. 8 is a cross-sectional view taken along line D-D' of FIG. 7; the cross-sectional view taken along a line cutting the side opposite to the side having D-D' is the same as FIG. 5 of the second embodiment shown in FIG. 4; FIG. 9A is an exploded perspective view schematically illustrating an adhesive member and a lower frame of FIG. 7; and FIG. 9B is a combined perspective view schematically illustrating the adhesive member and the lower frame of FIG. 7.

Referring to FIGS. 7 through 9B, an adhesive member 490 according to the third exemplary embodiment may further include an edge portion 493 extending from a base portion 491 and disposed along an edge of a display panel 200. The edge portion 493 may be disposed between a support portion 310 of an intermediate frame 300 and the display panel 200. Due to the addition of the edge portion 493, a bonding strength between the display panel 200 and the intermediate frame 300 may be intensified, and the display panel 200 may be stably fixed.

As set forth above, according to exemplary embodiments of the present invention, the display device may stably fix the display panel to the lower frame and the optical sheet, may prevent the optical sheet from being pressed down, and may prevent a light loss due to a tape.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device, comprising:
a display panel;
a light source supplying light to the display panel;
a lower frame on which the light source and the display panel are disposed;
a light guide plate disposed between the lower frame and the display panel to redirect light emitted from the light source toward the display panel;
an optical sheet disposed between the light guide plate and the display panel; and
an adhesive member having one surface attached to the display panel and the other surface attached to the optical sheet, wherein the adhesive member includes:
a base portion disposed between the optical sheet and the display panel; and
a protrusion portion protruding from a surface of the base portion and disposed proximate to a side surface of the optical sheet,
wherein the base portion and the protrusion portion are a monolithic unit, and
wherein the base portion is disposed between the lower frame and the display panel.

2. The display device of claim 1, wherein the protrusion portion is in contact with the light guide plate.

3. The display device of claim 1, wherein the protrusion portion has a thickness greater than or equal to a thickness of the optical sheet.

4. The display device of claim 1, wherein the adhesive member has a reflective surface reflecting light emitted from the light guide plate.

5. The display device of claim 1, wherein the lower frame includes:
a bottom portion;
a side surface portion extending from the bottom portion; and
a panel support portion extending from the side surface portion to be parallel with respect to the bottom portion.

6. The display device of claim 5, wherein the protrusion portion is disposed between the support portion and the optical sheet.

7. The display device of claim 5, wherein the base portion is disposed between the panel support portion and the display panel.

8. The display device of claim 7, wherein the light source is disposed between the bottom portion and the panel support portion.

9. The display device of claim 1, further comprising an intermediate frame coupled to the lower frame and on which the display panel is disposed.

10. The display device of claim 9, wherein the intermediate frame includes:
a support portion on which the display panel is disposed; and
a side wall portion extending from a surface of the support portion.

11. The display device of claim 10, wherein the base portion is disposed between the support portion and the display panel.

12. The display device in claim 10, wherein the sidewall portion is provided in a portion of the display panel, the portion of the display panel consisting of three sides of the display panel.

13. The display device of claim 10, wherein the adhesive member further includes an edge portion extending from the base portion and disposed along an edge of the display panel.

14. The display device of claim 13, wherein the edge portion is disposed between the intermediate frame and the display panel.

15. The display device of claim 14, wherein the edge portion is disposed between the support portion and the display panel.

16. A display device, comprising a display panel;

a light source supplying light to the display panel;

a lower frame on which the light source and the display panel are disposed;

a light guide plate disposed between the lower frame and the display panel to redirect light emitted from the light source toward the display panel;

an optical sheet disposed between the light guide plate and the display panel; and an adhesive member having one surface attached to the display panel and the other surface attached to the optical sheet, wherein the adhesive member includes:

a base portion disposed between the optical sheet and the display panel;

a protrusion portion protruding from a surface of the base portion and disposed proximate to a side surface of the optical sheet; and an edge portion extending from the base portion and disposed along an edge of the display panel, wherein the base portion and the protrusion portion are a monolithic unit, and wherein the base portion is disposed between the lower frame and the display panel.

17. A display device, comprising a display panel;

a light source supplying light to the display panel;

a lower frame on which the light source and the display panel are disposed;

a light guide plate disposed between the lower frame and the display panel to redirect light emitted from the light source toward the display panel;

an optical sheet disposed between the light guide plate and the display panel;

an intermediate frame coupled to the lower frame and on which the display panel is disposed; and an adhesive member having one surface attached to the display panel and the other surface attached to the optical sheet, wherein the adhesive member includes:

a base portion disposed between the optical sheet and the display panel; and a protrusion portion protruding from a surface of the base portion and disposed proximate to a side surface of the optical sheet, the intermediate frame is provided in a portion of the display panel, and the portion of the display panel consisting of three sides of the display panel.

* * * * *